United States Patent [19]

Bendell et al.

[11] Patent Number: 4,532,550
[45] Date of Patent: Jul. 30, 1985

[54] EXPOSURE TIME CONTROL FOR A SOLID-STATE COLOR CAMERA

[75] Inventors: Sidney L. Bendell; Cydney A. Johnson, both of Burlington, N.J.

[73] Assignee: RCA Corporation, Princeton, N.J.

[21] Appl. No.: 575,570

[22] Filed: Jan. 31, 1984

[51] Int. Cl.³ .............................................. H04N 3/14
[52] U.S. Cl. .................... 358/213; 358/228; 358/225
[58] Field of Search ............... 358/209, 211, 212, 213, 358/214, 215, 216, 217, 225, 227, 228, 102, 113, 134; 357/30

[56] References Cited

U.S. PATENT DOCUMENTS

| | | | |
|---|---|---|---|
| 3,303,271 | 2/1967 | Hecker | 358/225 |
| 4,161,000 | 7/1979 | Cleveland | 358/225 |
| 4,171,529 | 10/1979 | Silberberg et al. | |
| 4,280,141 | 7/1981 | McCann et al. | 358/213 |
| 4,363,034 | 12/1982 | Grancoin et al. | |
| 4,370,677 | 1/1983 | Baldwin et al. | 358/225 |
| 4,399,464 | 8/1983 | Hix et al. | 358/213 |
| 4,427,996 | 1/1984 | Tamura | 358/228 |
| 4,489,350 | 12/1984 | Kimura | |

FOREIGN PATENT DOCUMENTS

| | | | |
|---|---|---|---|
| 3022786 | 1/1981 | Fed. Rep. of Germany | 358/228 |
| 57717 | 5/1977 | Japan | 358/228 |
| 44271 | 4/1981 | Japan | 358/213 |

OTHER PUBLICATIONS

U.S. patent application Ser. No. 330,033, filed Dec. 14, 1981, (Dischert).

Primary Examiner—Gene Z. Rubinson
Assistant Examiner—Robert Lev
Attorney, Agent, or Firm—Eugene M. Whitacre; Lawrence C. Edelman; William H. Meise

[57] ABSTRACT

A television camera includes a solid-state imager which forms a signal representative of the image during an integration interval. The integration interval is followed by a pull-down interval during which the integrated signal is transferred out of the photo-responsive region of the solid state imager. A shutter is provided which periodically prevents light from falling upon the photo-responsive region of the imager. The shutter is controllable for controlling the integration interval. Thus, by effectively adjusting the integration interval special effects such as "true" stop motion may be provided from a television scene.

21 Claims, 6 Drawing Figures

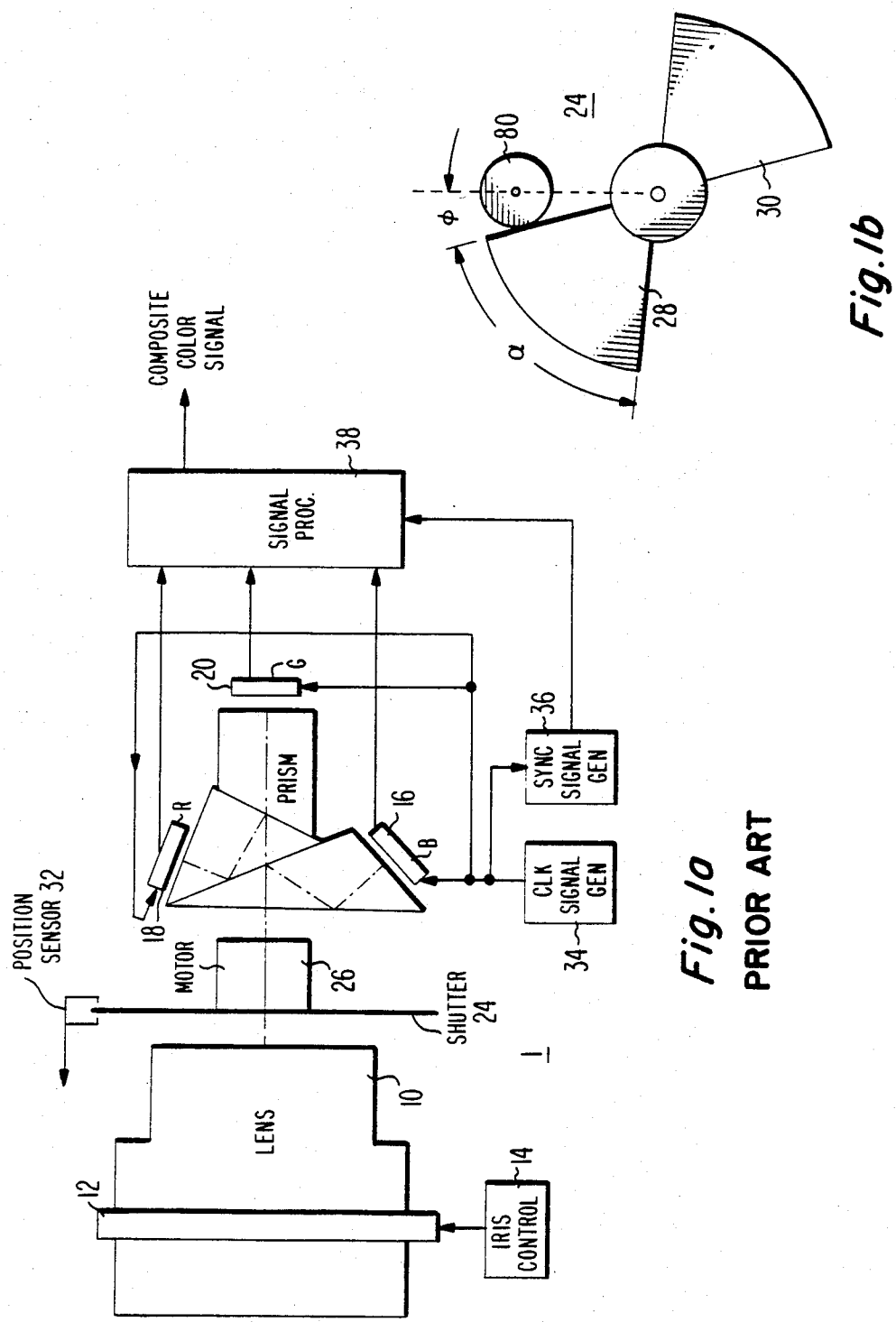

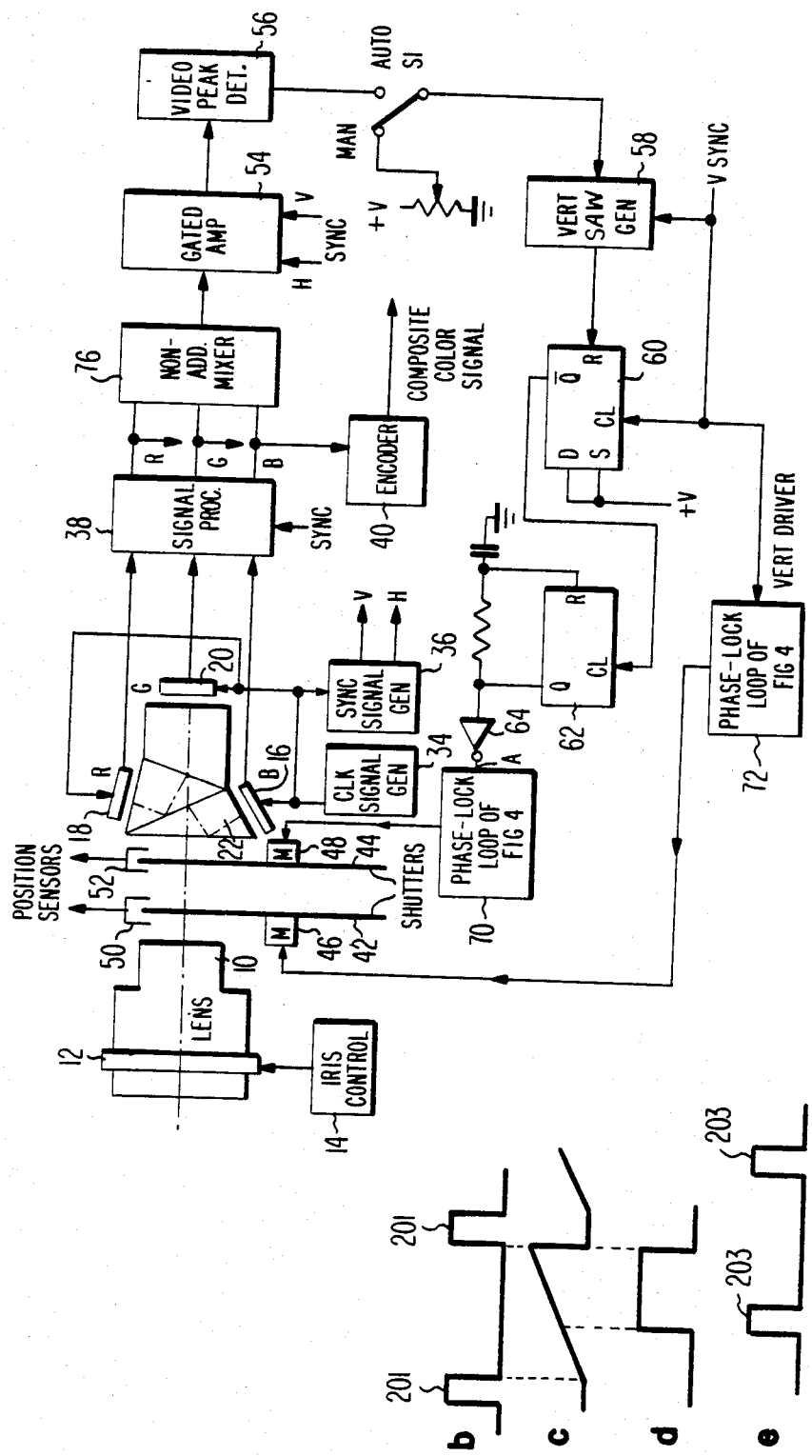

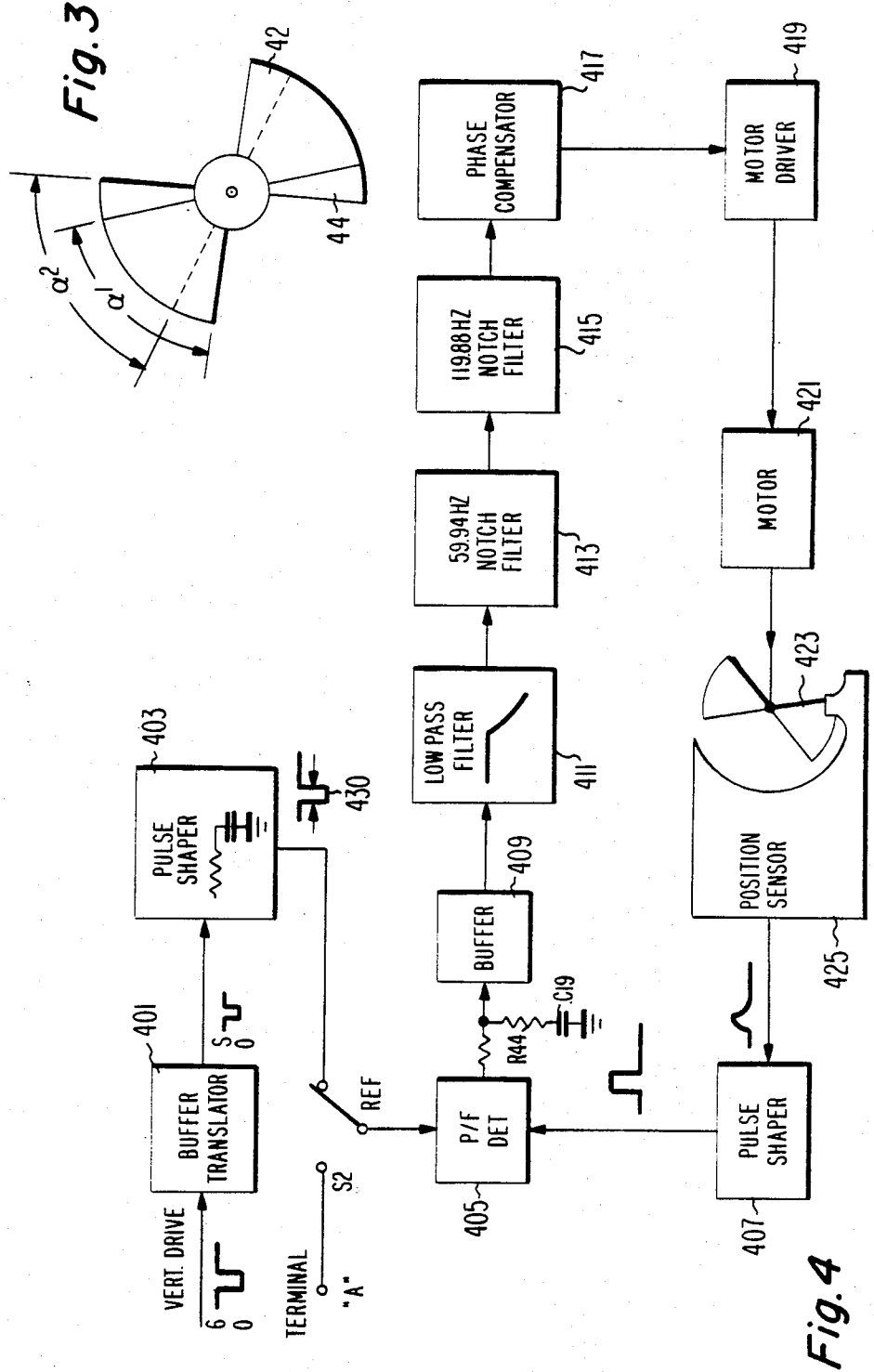

EXPOSURE TIME CONTROL FOR A SOLID-STATE COLOR CAMERA

The present invention relates to television cameras having exposure time control and, more particularly, to solid-state color cameras having a variable apertured shutter for varying the exposure time.

BACKGROUND OF THE INVENTION

In a tube-type color camera the effective exposure time is 1/30th of a second, comprised of two interlaced fields of 1/60th of a second each. One of the drawbacks in tube-type cameras is that they exhibit low resolution when picking up fast moving objects. In the past an optical shutter has been evaluated in such cameras to shorten the exposure time, however, the results have not been impressive due to the lag characteristics of tube-type sensors.

A solid-state camera has zero lag and, therefore, is a good sensor for picking up fast moving objects. With such a zero lag device it is now feasible to use optical shuttering to enhance the dynamic resolution of the camera. In a frame transfer (also known as a field-transfer) charge-coupled device it is generally considered to be necessary that the imager be optically shuttered during the interval (vertical blanking) in which the charge accumulated in the imaging area of the device is transferred to the storage area of the device. Failure to shutter during this period causes vertical image smear, most noticeable when picking up scenes containing highlights. In a frame transfer CCD having 403 horizontal elements the effective exposure time is 1/60th of a second due to the method of signal readout. Interposing a mechanical shutter (rotating wheel) between the main camera lens and the prism system eliminated frame transfer smear and incidently achieves a limited amount of optical shuttering.

In U.S. patent application Ser. No. 330,033 filed on Dec. 14, 1981, in the name of R. A. Dischert a solid-state camera is disclosed which includes a shutter arrangement for controlling the exposure time of the camera. In accordance with one aspect of the Dischert application, two similar shuttering devices are arranged in series such that the combined effective width of the shutter blades may be adjusted to improve the resolution of the moving images. Two shutters are arranged coaxially on shafts which are long enough to protrude through the camera housing so they are accessible to allow relative rotation therebetween. With this arrangement, the light passage between the blades of the shutter system can be reduced to a slit to provide "true" stop motion of an image during action sequences.

In accordance with the present invention a shuttering system is provided which permits automatic exposure time control of a solid-state camera. For example, two similar shutters are arranged coaxially. One shutter motor is locked to vertical sync while the other shutter motor which is also locked to vertical sync is provided with a variable phasing control. Variation of the relative phase of the two shutters changes the effective exposure time.

A variable shutter exposure control permits the camera operator to select different exposure techniques for artistic or special-effect purposes. Essentially all television cameras have an automatic iris control. Control of the iris is normally based on a measurement of the highest signal (in the red, green or blue channel) in the central area of the picture. The iris drive motor is servoed in a manner such that constant peak signal level is maintained at the camera output. According to this method the exposure time control of the shutter is varied manually and constant output signal is maintained by the automatic iris servo. In an alternative method of operating, the camera system could be run so that the iris is positioned in a fixed position and then servo the exposure time of the shutter to achieve constant camera output signal. Such a dual system is analagous to that used in modern single lens reflex film cameras. Such systems are referred to as "aperture preferred" or "exposure preferred".

SUMMARY OF THE INVENTION

A camera having an image transducing means provides television signals representative of a scene. The image transducing means includes a photosensitive surface for generating signal in response to received radiant energy from a scene. Further, the camera includes shutter means arranged to block radiant energy from the scene from reaching the photosensitive surface during a portion of a television field. The shutter means is automatically controllable for varying the portion of the a television field during which radiant energy is blocked.

BRIEF DESCRIPTION OF THE DRAWING

In the drawing:

FIG. 1a illustrates, partially in block diagram form, a prior art solid-state camera including a three-port color splitting prism and three solid-state imagers;

FIG. 1b shows a shutter arrangement;

FIG. 2 shows a timing sequence;

FIG. 2a illustrates, partially in block diagram form, a solid-state camera arrangement in accordance with the principles of the present invention;

FIG. 3 illustrates the details of the dual shutter arrangement in accordance with one embodiment of the present invention; and FIG. 4 illustrates, partially in block diagram form, a circuit for providing the servo control of the dual shutters of the present invention.

DETAILED DESCRIPTION OF THE PREFERRED EMBODIMENTS

In FIG. 1 a prior art solid-state television camera 1 is shown. Camera 1 includes a zoom lens 10 with an iris 12 which is controlled by iris control 14. The lens focuses a scene (not shown) onto the surfaces of a blue-responsive solid-state imager 16, a red-responsive image 18 and a green-responsive image 20.

Iris 12 controls the relative amount of light that passes through lens 10 by controlling the effective lens aperture diameter. When the scene is bright the iris contracts to permit less light to pass through and when the scene is dimly lighted the iris expands to permit more light to come in. Another important feature of the iris is to control the depth of field of the scene, i.e., the distance between the nearest object of the scene in focus and the farthest object in focus. By controlling the iris opening manually and controlling the exposure time by other means one may enhance the artistic features of a television camera.

A shutter 24 in the form of a notched wheel forming two blades is rotated by motor 26 so that the blades alternately pass between lens 10 and prism 22 as the shutter rotates. Referring to FIG. 1b the details of shutter 24 are shown. The shutter includes two blades 28 and 30 which are opaque so that the blades shut off light to, or shutter, the imagers when interposed in the light path. Motor 26 is coupled to a reference signal (not shown) for maintaining the shutting off of light by the shutter blades in synchronism with the pulldown interval for the imagers. A position sensor 32 which senses the angular speed and phase of shutter 24 is coupled to the servo loop for controlling the motor for maintaining the synchronism of the shutter.

In order to shutter the imagers during each pulldown interval, the shutter has two blades disposed 180° apart (it should be noted that the shutter may include less than or more than two blades, illustratively, the camera described herein will use two blades for reasons of inherent dynamic balance and reduced motor bearing wear). Each blade shutters the imager once during each half-rotation of the shutter or once during each field interval. The approximate angular sector $\alpha$ subtended by each of the two blades includes a first angular portion $\alpha_1$ proportional to 180° in the same ratio as the pull-down time $t_{pd}$ to the field interval time $t_f$, plus second angular portion $\alpha_2$ representing twice the angular width $\phi$ of light cone 80 to be cut, $$\alpha = \frac{t_{pd}}{t_f}(180°) + 2\phi$$

Each of the solid-state imagers 16, 18, 20 may be of the CCD frame transfer type (also known as field transfer CCD) which include an "A" register onto which light is focused and in the surfaces of which photoelectrons are generated. Of course, it should be realized that the present invention is not limited to frame-transfer CCDs, as other solid-state imagers may be used. The photoelectrons are constrained within vertical channels on the imager. Vertical motion of the accumulated image representative charge is controlled by polyphase (e.g., three phase) clock voltages applied to control electrodes from clock signal generator 34. After an integrating period, the clock signals are activated to produce transfer of the electrons into the corresponding portions of a "B" register which is free from light influence. The accumulated charge which resides under the control electrode of the "B" register is clocked line by line in parallel from the "B" register to a "C" register, from which they are clocked in serial fashion by clock signals applied to the clock electrodes from the clock signal generator 34. The signals are clocked out of the "C" register in serial fashion in response to the polyphase "C" clock drive. The clocking signal generator 34 is coupled to sync signal generator 36 which generates synchronizing signals used in a television signal. The output of the sync signal generator is applied to signal processor 38 so as to insert synchronizing, blanking, equalizing and burst signals.

The output signals from imagers 16, 18 and 20 are applied to signal processor 38 which may include, black level correction, clamps, shading, gamma correction, matrixing circuits and other types of standard signal processing. The R, G, B signals are matrixed to Y, I, Q and the color representative components are quadrature-modulated onto a subcarrier to form a composite signal such as NTSC or PAL.

One problem to which the invention is directed is that of exposure time control. By varying the relative phase of two shutters the effective exposure time of the camera can be adjusted for providing special effects such as "true" stop motion or the like.

FIG. 2 shows a camera system in accordance with the principles of the present invention. In the Figures, elements designated with like reference numerals are the same or similar items in the various Figures. The camera includes a zoom lens 10, iris 12, iris control 14 and imagers 16, 18 and 20. Prism 22 is used to split incoming light into its primary colors for projection onto respective imagers 16, 18 and 20. The signal from imager 16, 18 and 20 is delivered to signal processor 38 which provides R, G and B signals to encoder 40 which may include a matrix circuit forming the composite color signal for use in the standard television receiver. Interposed between lens 10 and prism 22 are a pair of rotary shutters 42 and 44. Shutter 42 is driven by motor 46 and shutter 44 by motor 48. Each shutter includes a position sensor 50 and 52, respectively, for providing speed and phase information to a servo control loop for use in controlling the speed and phase of shutters 42 and 44.

According to one aspect of the invention the two shutters 42 and 44 (FIG. 3) are arranged coaxially but may be rotated independently. In this system, shutter 44 is locked to the vertical sync and shutter 42 which is also locked to the vertical sync has a variable phasing control for varying the amount of shuttering performed by the combined shutter. The action of varying the relative phase of the two shutters changes the effective exposure time. For example, with exact phase alignment of two 70° shutters (70° opaque, 110° transmissive) the exposure time for a field is (180°-70°) degrees out of 180° degrees or 0.0102 seconds. If the shutters are misphased completely (140° opaque, 40° transmissive) the effective exposure time is 0.0037 seconds. This gives a time exposure range of about 2.8 times. If on the other hand, the opaque angle of each shutter blade is equal to 80° the exposure range would be increased to 5 times. Other variations of the included angle may be made to change the exposure range. Two servo controls are used for controlling the shutters. The servo control for controlling the speed and phase of the two shutters will be explained with reference to FIGS. 2 and 4. First, the servo control for the shutter for maintaining the critical pull-down interval will be explained with reference to FIG. 4. For shutter 42 which is used for controlling light during the fixed pull-down interval the reference signal for the servo loop is derived from the vertical blanking pulse, hence switch S2 is placed in the position illustrated in FIG. 4. The vertical drive pulse is delivered to buffer translator 401 which is used for level shifting and isolating the servo shutter circuit from the vertical drive distribution bus. The buffered vertical drive is delivered to pulse shaper 403. The gates of pulse shaper 403 are used to generate a narrow negative-going pulse illustrated as 430 whose positive going edge transition is used as a reference time by phase/frequency comparator 405. Switch S2 is positioned as shown in FIG. 4 for the servo control of shutter 42. Phase/frequency comparator 405 generates an error signal to establish and update the shutter motor to a constant speed and consistent phase relative to the pull-down interval. The phase is necessary to position the shutter in such a matter that no light falls on the "A" register of the CCD when the transfer of the video signal is made from the "A" to the "B" register during the vertical interval. This error signal is related to the difference in the timing of two pulses, one from pulse shaper 403 which is a stable reference and another which is the feedback pulse from pulse shaper 407. Illustratively, phase/frequency detector 405 may be an RCA 4046 phase comparator. The output of phase/frequency detector 405 is high when the motor speed is low and low when the motor speed is high. When reference speed is obtained the output is a negative or positive-going pulse whose duration is related to the phase duration between the reference signal and the feedback signal. When both the frequency and the phase are locked-up the output of the phase/frequency detector is an open circuit. Capacitor C19 maintains the average DC level while phase/frequency detector 405 is open circuited. The time constant of R44 and C19 are such that the update signal may be applied directly to buffer 409. Buffer 409 presents a high impedance to the output of the phase/frequency detector 405. The output from buffer 409 is deleivered to low pass filter 411. Low pass filter 411 has a cutoff frequency in the region of the fundamental of the shutter speed to reduce the noise applied to the motor at high frequencies. The output from low pass filter 411 is applied to notch filters 413 and 415 in serial fashion. These outputs which are notched at approximately 60 and 120 Hz to keep any residue from the update pulses from being directly applied to the motor, thus aiding in eliminating motor jogging and singing. The output from notch filter 415 is applied to phase compensator 417. Phase compensator 417 is a phase lead compensator which compensates for phase errors effectively damping the mechanical system thus providing stability to the servo loop. The output from phase compensator 417 is delivered to motor driver 419 which in turn drives motor 421 and shutter 423 (either shutter 42 or shutter 44 of FIG. 2). A position sensor 425 is arranged to detect the edge or some appropriate part of shutter 423 to provide a signal related to the speed and phase of the shutter. The output from position sensor 425 is delivered to pulse shaper 407 which provides a squared-up pulse which is the feedback pulse to phase/frequency detector 405. Thus, the phase-lock loop of FIG. 4 maintains the reference position of rotating shutter 423, as established by the position sensor, so that the reference position occurs at the instant of the reference timing pulse.

Referring again to FIG. 2 shutter 44 is normally controlled by the signal output from signal processor 38. In other words, the phasing of shutter 44 is controlled relative to that of shutter 42 to control the exposure time of the overall shutter system. In this arrangement, switch S2 of PLL 70 (also illustrated by FIG. 4) is thrown so that the signal from terminal "A" is delivered to phase/frequency detector 405. It should be noted that for each shutter a separate servo arrangement would be required.

The material that follows will describe the generation of a phase-shifted reference pulse 203 for servo arrangement 70 for control of the second shutter, i.e., shutter 44. The R, G, B signals from signal processor 38 are supplied to a matrix and encoding circuit illustrated as a block 40, and also to nonadditive mixer 52 which selects the signal of the largest value for delivery to gated amplifier 54. Gated amplifier 54 selects the signal from near the center of the picture for exposure control. That is, gated or gain-controlled amp 54 center weights the signal from nonadditive mixer 52 for use in controlling the exposure of the system. Horizontal and vertical synchronizing pulses are delivered to gated amplifier 54 for use in selecting the centered value. The output from gated amplifier 54 is delivered to video peak detector 56. In the automatic arrangement, as described now, it is assumed that the iris control would be set at some fixed value and that the exposure control would be performed by control of the phasing of the shutters. Therefore, in this arrangment switch S1 would be switched to the automatic position. The signal from video peak detector 56 is delivered to vertical saw generator 58 which provides a variable ramp as a function of the magnitude of the video peak. Referring to FIGS. 2b and c, FIG. 2b illustrates the vertical drive pulses 201. The vertical drive pulses are applied to the clock (CL) input terminal of D flip-flop (FF) 60 to set or latch a $\overline{\text{HIGH}}$ (a low) at the $\overline{Q}$ output terminal. The output of vertical saw generator 58 is illustrated by the ramp of FIG. 2c. This output from vertical saw generator 58 is applied to the reset input of flip flop 60. When the vertical saw output reaches a particular value, FF60 resets and the $\overline{Q}$ output which was set low changes states to a high level which is delivered to the clock input of astable flip flop 62. The Q output of flip flop 62 is a pulse, the duration of which is controlled by an R-C timing network, which is delivered to inverter 64. The output of inverter 64 is a reference pulse, very similar in shape to the pulse delivered from pulse shaper 403 of FIG. 4, which is delivered via terminal "A" and switch S2 to the phase/frequency detector 405 of servo control loop 70 for use in controlling the speed and phase of shutter 44. The details of the servo control loop for controlling shutter 44 will not be explained since it has already been explained with reference to the servo control loop of shutter 42.

In operation, servo loop 70 controls the reference position of rotating shutter 44 so that the reference position occurs at the time of the phase-shifted pulse 203. Thus, by changing the position of pulses 203 relative to pulses 201, the relative position of the shutter may be varied. Thus, one shutter, i.e. 42, has its speed and phase controlled by the vertical blanking pulse of a television signal while the other shutter, i.e., 44, is controlled based on light in the scene. In another arrangement switch S1 of FIG. 2a may be switched to the manual position wherein the phasing of shutter 44 is controlled manually so that in this arrangement, for example, the iris servo control can be used for the exposure control while the shutter servo is maintained in a fixed position. As suggested above there are several different arrangement for this time exposure control. In one arrangement the shutters could be manually positioned to just permit a slit of light to pass through thus effecting a true stop action output from the camera. In the other arrangements "aperture preferred" or "exposure preferred" systems may be provided.

Four possible modes of operation will be described. In one operating mode the iris of the lens may be set to a fixed "f" number and the shutter control may be manually controlled to preserve signal constancy. In another operating mode the shutter timing is set to a fixed value and the iris is manually controlled to preserve signal constancy. In a third arrangement the iris of the lens may be set to a fixed "f" number and the shutter timing servo may be set to an automatic position to preserve signal constancy. In a fourth arrangement the shutter timing is set to a fixed value and the iris servo is operated in the automatic position to preserve signal constancy. Such an arrangement provides a great deal of latitude in providing special effects and creating special artistic effects.

While the principles of the present invention have been demonstrated with particular regard to the illustrated structures of the Figures, it will be realized that various departures from such illustrated structures may be undertaken in practice of the invention. The widths of the blades of the two shutters may be made unequal, if desired. While especially advantageous for solid-state imagers, the described arrangements may be applicable to camera tubes. The embodiments described use rotating shutters, but linear or other types of shutters could be used.

What is claimed is:

1. A television camera, comprising:
   solid-state image transducing means including a photosensitive surface for generating signal in response to received radiant energy from a scene during an integration interval; and
   optical shutter means arranged to block radiant energy from said scene from reaching said photosensitive surface during all of a television field except during a portion of said integration interval, said optical shutter means being automatically controllable in response to the level of said received radiant energy for varying that portion of said integration interval during which radiant energy is blocked.

2. The camera according to claim 1 wherein said solid-state image transducing means is a charge-coupled device.

3. The camera according to claim 2 wherein said charge-coupled device is a frame transfer imager.

4. A television camera, comprising:
   solid-state image transducing means including a photosensitive surface for generating signal in response to received radiant energy from a scene during an integration interval; and
   first and second shutters arranged to block radiant energy from said scene from reaching said photosensitive surface during all of a television field except during a portion of said integration interval, the relative positions of said first and second shutters being automatically adjustable in response to the level of said received radiant energy to vary that portion of said integration interval during which radiant energy is blocked.

5. The camera according to claim 4 wherein said solid-state image transducing means is a charge-coupled device.

6. The camera according to claim 5 wherein said charge-coupled device is a frame transfer imager.

7. A television camera, comprising:
   solid-state image transducing means including a photosensitive surface for generating signal in response to received radiant energy from a scene during an integration interval;
   a first shutter having a first blade for blocking radiant energy from said scene from reaching said photosensitive surface during recurrent fixed duration portions of a television field which do not include said integration interval; and
   a second shutter having a second blade cooperatively arranged with said first shutter and automatically controlled such that radiant energy is blocked during recurrent variable duration portions of a television field which include said integration interval.

8. The camera according to claim 7 wherein said solid-state image transducing means is a charge-coupled device.

9. The camera according to claim 8 wherein said charge-coupled device is a frame transfer imager.

10. A camera, comprising:
    image transducing means including a photosensitive surface for generating signal in response to received radiant energy from a scene;
    a first shutter for blocking radiant energy from said scene from reaching said photosensitive surface during a portion of a television field;
    first motor means, coupled to said first shutter, for driving said first shutter;
    first servo control means, coupled to said first motor means, for maintaining a predetermined speed and phase of said first shutter;
    a second shutter coaxially arranged with said first shutter for varying the portion of a television field during which radiant energy is blocked;
    second motor means, coupled to said second shutter, for driving said second shutter; and
    second servo control means, coupled to said second motor means, for maintaining the speed of said second shutter and for controlling the phase of said second shutter with respect to said first shutter to vary that portion of a television field during which radiant energy is blocked.

11. The camera according to claim 10 wherein said image transducing means is a charge-coupled device.

12. The camera according to claim 11 wherein said charge-coupled device is a frame transfer imager.

13. The camera according to claim 12 wherein at least a part of said portion of a television field is the transfer interval when signal is transferred from an imaging area of said device to a storage area of said device.

14. A television camera, comprising:
    image transducing means including a photosensitive surface for generating signal in response to received radiant energy from a scene;
    first light control means for controlling the relative amount of radiant energy from said scene that impinges on said photosensitive surface;
    first feedback means for automatically controlling said first light control means to compensate for the brightness of said scene, said first feedback means being switchable into a manual operating mode whereby the relative amount of radiant energy is fixed;
    second light control means for controlling the relative time that radiant energy from said scene impinges on said photosensitive surface; and
    second feedback means for automatically controlling said second light control means to compensate for the brightness of said scene, said second feedback means being switchable into a manual operating mode whereby said relative time is fixed.

15. The television camera according to claim 14 wherein said first light control means is an iris control and said second light control means is a variable aperture shutter.

16. The television camera according to claim 15 wherein said image transducing means is a charge-coupled device.

17. The camera according to claim 16 wherein said charge-coupled device is a frame transfer imager.

18. The camera according to claim 17 wherein at least a part of said portion of a television field is the transfer interval when signal is transfered from an imaging area of said device to a storage area of said device.

19. The camera according to claim 4 wherein said first and second shutters comprise rotating blade shutters.

20. The camera according to claim 9 wherein said first and second shutters comprise rotating blade shutters.

21. The camera according to claim 14 wherein changes in the amount of light impinging upon said photosensitive surface in response to manual operation of one of said first and second feedback means, is compensated for by automatic operation of the other of said first and second feedback means.

* * * * *